United States Patent [19]
Kennedy

[11] Patent Number: 5,062,868
[45] Date of Patent: Nov. 5, 1991

[54] METHOD AND APPARATUS FOR UNLOADING MOBILE VACUUM LOADERS

[75] Inventor: Michael R. Kennedy, Point Pleasant, N.J.

[73] Assignee: Aaxon Industrial, Inc., Avenel, N.J.

[21] Appl. No.: 564,611

[22] Filed: Aug. 9, 1990

[51] Int. Cl.$^5$ .............................................. B01D 46/00
[52] U.S. Cl. .......................................... 55/97; 55/356; 55/429; 15/340.1
[58] Field of Search ........................ 55/97, 356, 429; 15/340.1

[56] References Cited

U.S. PATENT DOCUMENTS

| | | | |
|---|---|---|---|
| 3,608,283 | 9/1971 | Huglo | 55/315 |
| 3,842,461 | 10/1974 | Wurster | 15/326 |
| 3,955,236 | 5/1976 | Mekelburg | 15/314 |
| 4,111,670 | 9/1978 | DeMarco | 55/315 |
| 4,218,226 | 8/1980 | Boozer | 55/274 |
| 4,227,893 | 10/1980 | Shaddock | 55/97 |
| 4,490,162 | 12/1984 | Davis | 55/213 |
| 4,578,840 | 4/1986 | Pausch | 15/340.1 |
| 4,828,187 | 5/1989 | Davis et al. | 241/24 |
| 4,932,988 | 6/1990 | Lutlerbach | 55/356 |
| 4,963,172 | 10/1990 | DeMarco | 55/356 |

Primary Examiner—Bernard Nozick
Attorney, Agent, or Firm—Clifford G. Frayne

[57] ABSTRACT

A method for cleaning and removing particulate matter collected in a mobile vacuum loader that has a plurality of collection chambers, the method consisting of isolating two adjacent collection chambers and providing an outlet conduit on the main or heavy collection chamber and an inlet conduit on the adjacent collection chamber and positioning a separation chamber in communication with these two conduits, drawing negative pressure through the chambers and thus removing the particulate matter from the heavy collection chamber and collecting it in the separation chamber for disposal.

3 Claims, 3 Drawing Sheets

METHOD AND APPARATUS FOR UNLOADING MOBILE VACUUM LOADERS

FIELD OF INVENTION

The present invention is directed towards a method for the collection and removal of wet or dry particulate matter and, in particular, to an improved method for emptying the mobile collector and ensuring that none of the particulate matter collected escapes to the ambient atmosphere particularly when the particulate matter collected is of a hazardous nature.

BACKGROUND OF THE INVENTION

Vacuuming apparatuses for particulate matter are well known in the prior art. Portable, heavy-duty vacuum collector apparatus are commonly used in industrial and other applications to collect wet and/or dry particulate materials. In a variety of industrial situations, the particulate matter to be collected may vary widely in particulate size and weight and in some instances, even include liquids. The efficient removal of particulate matter is required for the efficient operation of any industrial process. In recent years, serious import has been given to the health and safety factors associated with particulate matter in industrial operations. Of particular concern has been the cleanup of asbestos and asbeatoa-related products previously used in the construction industry and the cleanup of spills of hazardous particulate matter such as dioxin which threatened the health and safety of the public.

In the cleanup of such hazardous or toxic waste, it is important to ensure that the particulate matter collected is not reintroduced into the ambient atmosphere. It is also important to ensure that the particulate matter in very small size ranges is also collected from the airstream.

Mobile vacuum loaders presently utilized in the industry are presently disclosed in several U.S. patents; U.S. Pat. No. 4,227,893; U.S. Pat. No. 4,218,226; U.S. Pat. No. 3,955,236; U.S. Pat. No. 3,842,461; U.S. Pat. No. 4,111,670 and U.S. Pat. No. 3,608,283.

Of the aforementioned patents, U.S. Pat. No. 4,227,893 to Shaddock, and assigned to Peabody Meyers Corporation, represents one of the most popular mobile vacuum loaders in the industry.

Applicant is the holder of several U.S. patents directed towards improved methods for collection of particulate waste. In particular, Applicant is the holder of U.S. Pat. No. 4,490,162 for a low pressure HEPA filtration system for particulate matter utilized in conjunction with a system similar to that as disclosed by Shaddock in U.S. Pat. No. 4,227,893. Further, Applicant is the holder of U.S. Pat. No. 4,828,187 which illustrates a particulate separation chamber for the collection of hazardous particulate matter ensuring that the hazardous particulate matter does not escape to the ambient atmosphere and is disposable within the collection system disclosed by Applicant in the aforementioned patent.

Applicant's present invention is directed to certain improved modifications to a mobile vacuum loader such as disclosed in U.S. Pat. No. 4,227,893 when used in conjunction with Applicant's disclosure in U.S. Pat. No. 4,828,187 in order to ensure that the mobile vacuum loader can be effectively emptied without the possibility of the particulate matter collected by the mobile vacuum loader escaping to the ambient atmosphere.

OBJECTS OF THE INVENTION

It is a primary object of the present invention to provide for a novel and improved method for emptying or unloading a mobile vacuum loader by means of a negative pressure system, thus ensuring that there is no escape of the particulate matter to the ambient atmosphere.

It is a still further object of the present invention to provide a novel and improved method for the collection of particulate matter under negative pressure in which the particulate matter is removed from a vacuum loader directly into a disposal bag.

It is a still further object of the present invention to provide for a novel and improved method for the collection of particulate matter which obviates the need for opening the collection chamber or debris box of a mobile vacuum loader for unloading the collected particulate matter.

SUMMARY OF THE INVENTION

A method for cleaning and removing particulate matter collected in a mobile vacuum loader having a plurality of collection chambers, the method consisting of isolating two adjacent collection chambers, and providing an outlet conduit on the main or heavy collection chamber and an inlet conduit on the adjacent collection chamber, positioning Applicant's separation chamber in communication with these two conduits and drawing negative pressure through the chambers in the conduit thus removing the particulate matter from the heavy collection chamber and collecting it in Applicant's separation chamber.

BRIEF DESCRIPTION OF THE DRAWINGS

These and other objects of the present invention as well as the novel features thereof will become more apparent by reference to the following description particularly when taken in conjunction with the accompanying figures in which.

DETAILED DESCRIPTION OF THE DRAWINGS

Figure 1:
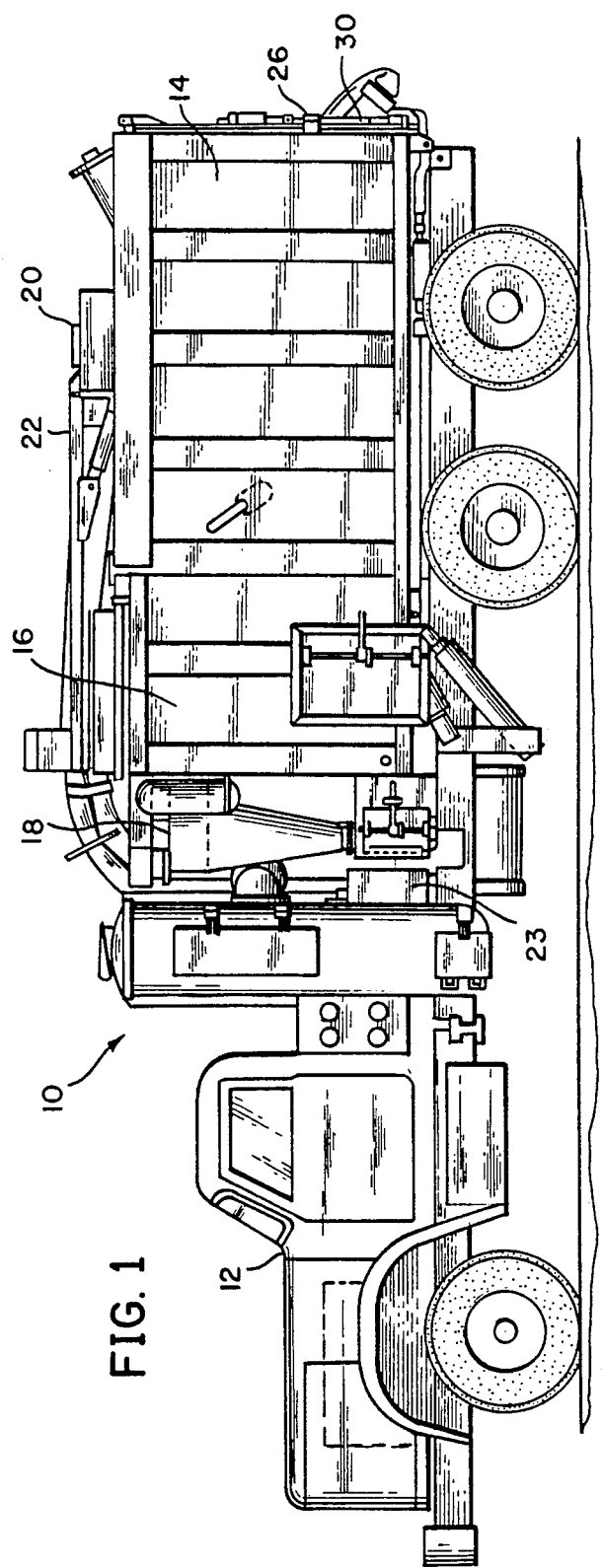
FIG. 1 is a side elevational view of a typical mobile vacuum loader.

FIG. 1 is a side elevational view illustrating a typical mobile vacuum loader 10. The loader is a self-contained unit mounted on a truck chassis having a forward cab portion 12 housing and engine and transmission for the mobility of the vehicle. A debris box 14 is tiltably mounted on the chassis rearwardly from the cab there being positioned between the debris box 14 and the cab 12, a bag filter 16 and a series of cyclone filters 18.

An inlet 20 is provided at the top of the debris box rearwardly from the doors and a flexible tubular debris pickup conduit or hose 22 is supported in a rotatable and tiltable boom overlying the debris box which serves as the conduit to discharge the particulate matter into the debris box.

Figure 2:
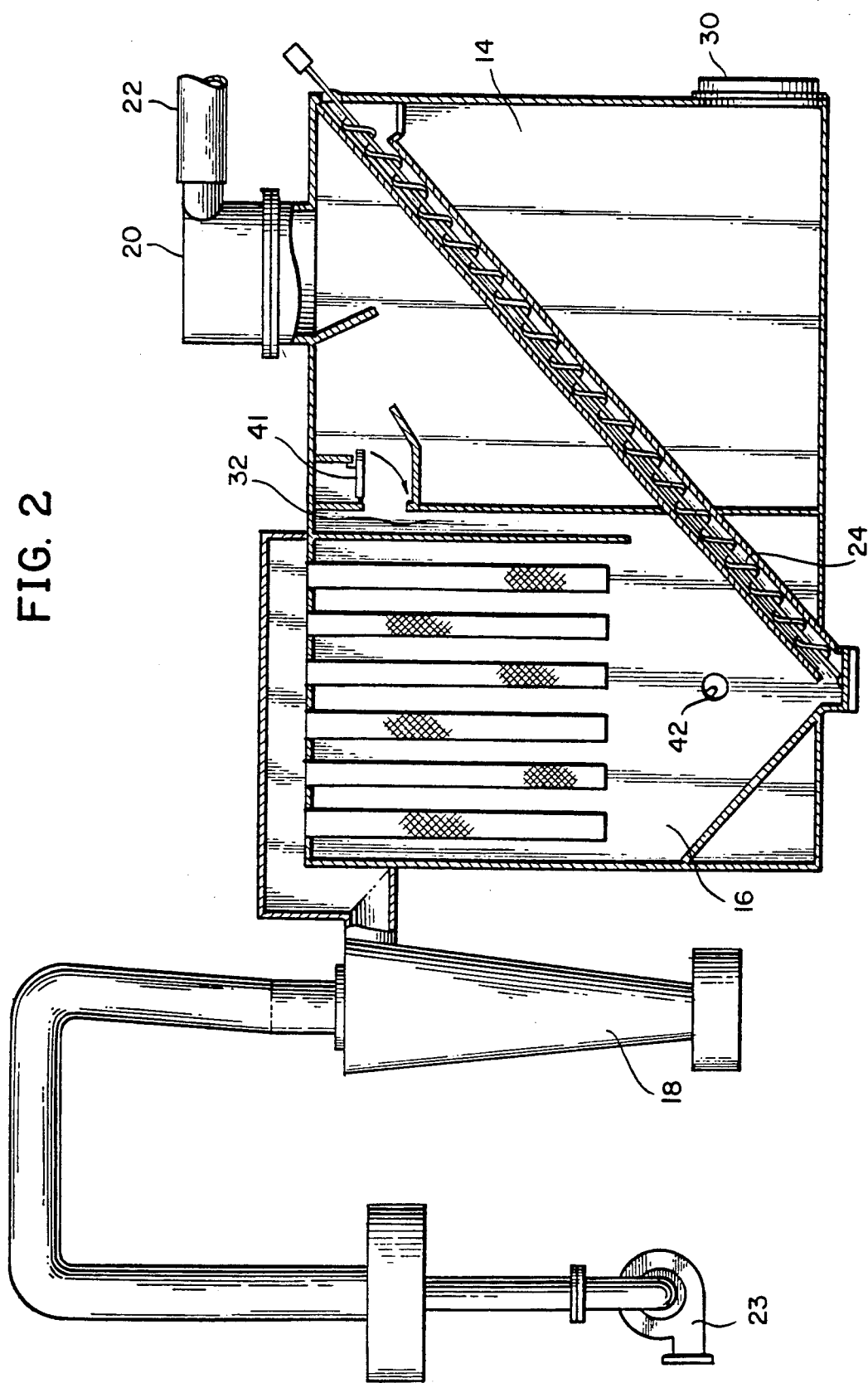
FIG. 2 is a side elevational cutaway schematic view of a portion of a mobile vacuum loader.

The mobile vacuum loader as shown provides for a blower assembly 23 which creates an airstream which sweeps or pulls the debris or other material through conduit 22 and inlet 20 into debris box 14. With reference to FIG. 2, heavier material settles in debris box 14 and the remainder of the material is swept into bag filter 16 through conduit 32 for further filtering, this material accumulating at the bottom of the bag filter chamber 16. The airstream is then drawn into cyclone filter 18 for further filtering and is discharged through the blower assembly 23 and the vehicle muffler into the atmosphere.

The particulate matter collected in the bag filter chamber 16 is transported to the debris chamber 14, by means of a worm or auger 24 which concentrates the particulate matter collected in the debris box for disposal. As disclosed in U.S. Pat. No. 4,227,893, the debris box is tiltable having a securable tailgate 26. Once filled, the particulate matter is either dumped or bagged. In the case of hazardous matter where escape to the ambient atmosphere is undesirable, the tiltable debris box creates problems in emptying and requires additional manpower or apparatus.

FIG. 2 is a side elevational cutaway view of the particulate collection system employed in the mobile vacuum loader which is the subject of U.S. Pat. No. 4,227,893. From this it can be seen that the debris box 14 is designed to collect the heavier particulate matter under the influence of gravity while the remaining airstream is subjected to bag filter chamber 16 which requires the air to pass through the filter bag medium before continuing on to the cyclone separator 18. The particulate matter collected in the bag chamber 16 is collected at the bottom of bag chamber 16 and transported to debris chamber 14 by means of auger 24.

The particulate matter thereby collected by the mobile vacuum loader is substantially located in the debris chamber 14 for removal. This is normally accomplished by drawing the debris from debris chamber 14 through access door 30 on tailgate 26 or tilting the debris chamber on the truck chassis for dumping. When the particulate matter collected is of a hazardous nature, the mobile vacuum loader has no efficient provision for removing the particulate matter. Applicant's modifications would allow for the efficient and safe removal of the particulate matter from the mobile vacuum loader utilizing the blower assembly 23 of the mobile vacuum loader or a second source, in conjunction with Applicant's particulate separation chamber as disclosed in U.S. Pat. No. 4,828,187.

Figure 3:
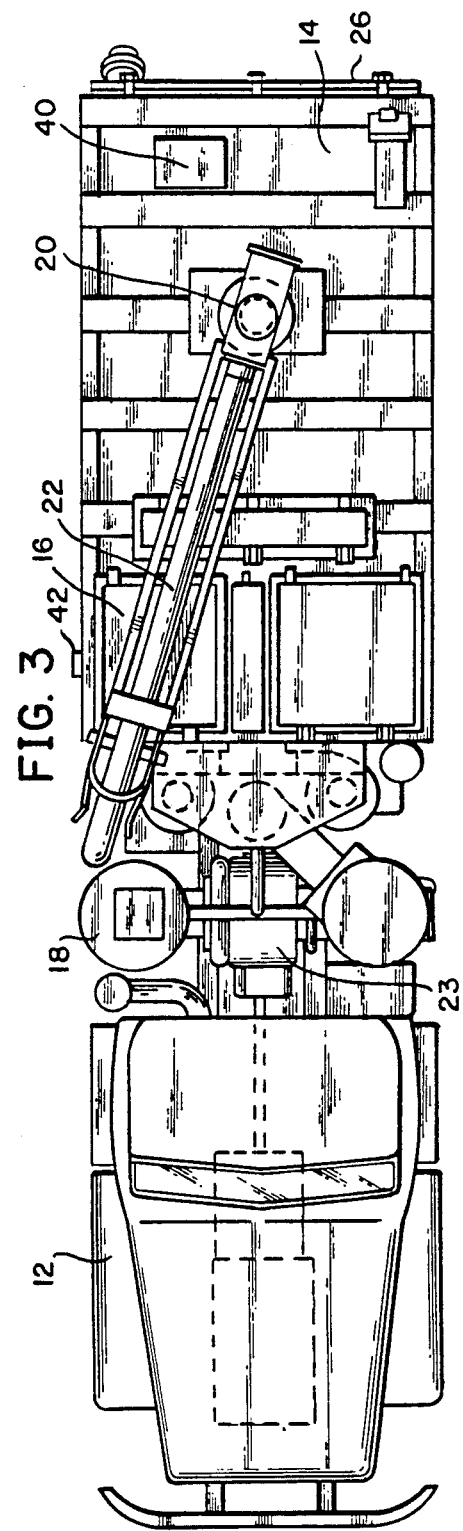
FIG. 3 is a view of a mobile vacuum loader showing the modifications in order to adapt the mobile vacuum loader to the cleaning and emptying method disclosed by Applicant

Referring to FIG. 3, there is illustrated a mobile vacuum loader 10 having the modifications necessary in order to unload the vacuum loader without exposure of the particulate matter to the ambient atmosphere. An access hatch 40 is positioned on the debris box. In the configuration shown, access hatch 40 is positioned on the top of the debris box. This allows the operator to position himself on top of the debris box 14 and insert a flexible conduit into debris box 14 such that the operator can maneuver the flexible conduit into all the corners of debris box 14. Access hatch 40 is of such a design that it is secured in a closed, locked position during the normal operation of the vacuum loader, but allows the operator to remove the securing mechanism in order to gain access to the debris box.

Figure 4:
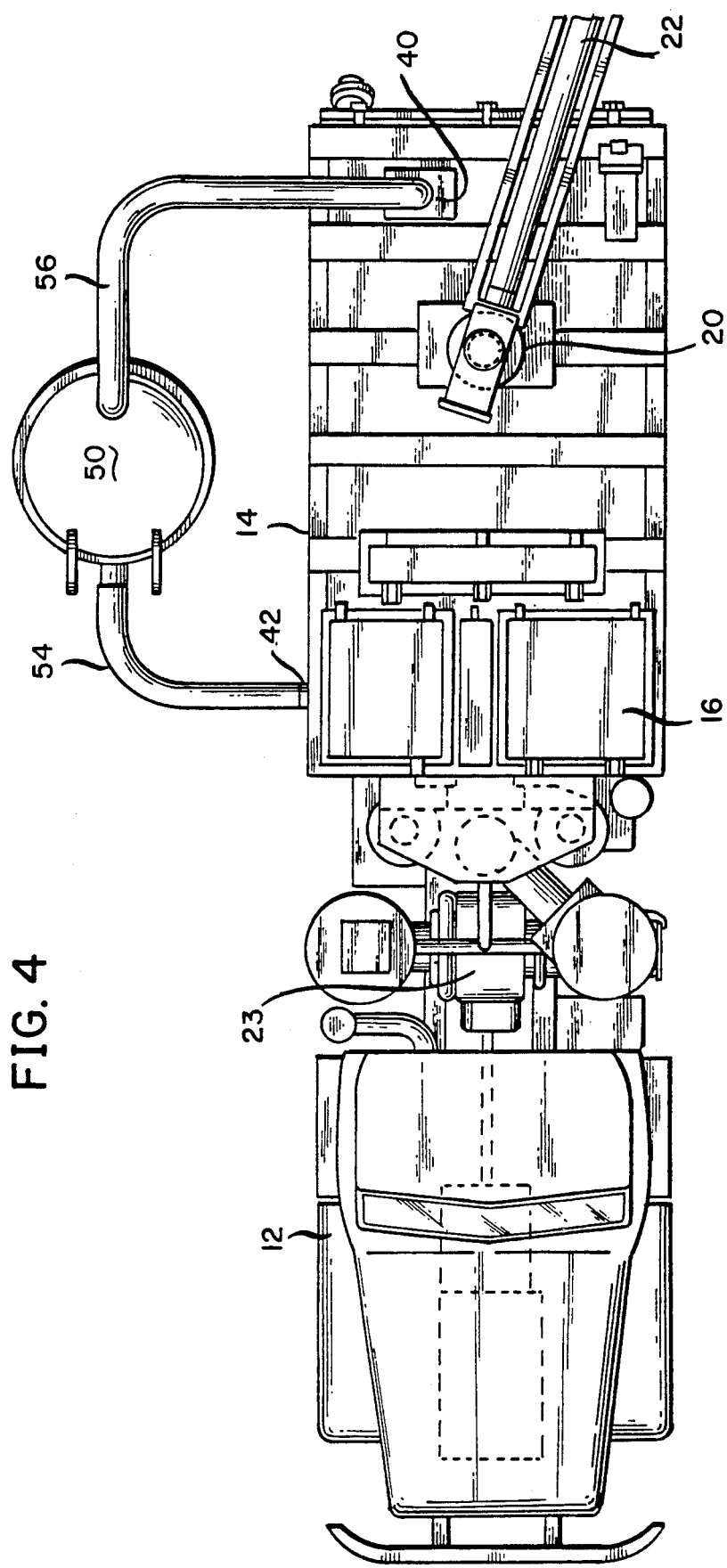
FIG. 4 is a top planer view of a mobile vacuum loader and Applicant's separation chamber showing the modifications and adaptations for cleaning and empting the mobile vacuum loader.

A second access connection is positioned in communication with the bag chamber. As shown in FIG. 3, this access conduit 42 is positioned on the side of the bag chamber, and with respect to the vehicle shown in FIG. 3, on the passenger side of the vehicle so as to not interfere with operational mechanisms on the driver's side of the vehicle. Access conduit 42 is positioned such that it provides access to the lower portion of the bag chamber. In this configuration, a separation and bagging chamber as disclosed in Applicant's U.S. Pat. No. 4,227,893 and illustrated in FIG. 4, may be utilized to empty the mobile vacuum loader.

The inlet conduit 56 between the separation chamber 50 and the debris box 14 would be inserted through access hatch 40. The outlet conduit 54 from separation chamber 50 would be secured to access conduit 42 in the bag filter chamber 16. The engine on the mobile vacuum loader would then be started and the blower assembly 23 would draw air from the cyclone separator 18, the bag chamber 16, the conduit 54 between the bag chamber and the separation chamber, and thence to conduit 56 which was inserted through access hatch 40 into debris box 14. Conduit 32 (FIG. 2) between debris box 14 and bag filter chamber 16 as disclosed in FIG. 2, would be secured in a closed position. Therefore, the negative pressure or suction created by the blower would draw the particulate matter collected in the debris box through the conduit 56 in access hatch 40 to the bag separation chamber where this particulate matter would be collected in accordance with the teachings of Applicant's aforesaid U.S. Pat. The remaining airstream would be drawn back into the bag separation chamber 16 on the mobile vacuum loader and pass upwardly through the bag filters removing particulate matter remaining in the airstream and thence through the cyclone separator and HEPA filtration chamber further removing particulate matter before being exhausted to the air. In this configuration, the mobile vacuum loader can be more easily emptied with its contents going directly to a bagging means for proper disposal.

It will be recognized by those skilled in the art that access hatch 40 and access conduit 42 may be repositioned for convenience and that their positions as disclosed herein are merely for illustration.

Applicant has described his method for cleaning and the removal of particulate matter from a mobile vacuum loader with respect to a particular type of mobile vacuum loader. vehicles of this type vary, but normally include a plurality of filtering or collection chambers with an airstream driven by a vehicle mounted blower. Applicant's disclosure would have application to these other vacuum-type loaders having a plurality of chambers where chambers could be isolated and access means fabricated such that Applicant's separation chamber could be substituted in the flow path between chambers on the vehicle in order to collect and bag the particulate matter collected in the vehicle chambers.

A separation chamber 50 would be operated in the manner as disclosed in Applicant's U.S. Pat. No. 4,227,893. When separation chamber 50 becomes full, the bag collecting means contained therein would be secured and disposed of in accordance with the teachings of the aforesaid patent and a new bag would be inserted and the process would continue until the mobile vacuum loader was empty. Two separation chambers 50 could be used in tandem such that the process could be continuous without interruption.

A typical debris box may hold up to 10 to 12 cubic yards of particulate matter. The method disclosed herein reduces the off loading time, in particular, with hazardous material from as long as 24 hours to 4 to 5 hours While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A method for cleaning and removal of particulate matter collected in a mobile vacuum loader wherein the particulate matter suspended in an airstream is introduced into said mobile vacuum loader and subjected to a flow path whereby heavier particulate matter is first collected in a debris box; said debris box in communication by means of a conduit with a subsequent bag filter chamber for the further collection of particulate matter suspended in said airstream, said bag filter chamber in communication by means of a conduit with a subsequent cyclone separator for further removal of particulate matter suspended in said airstream, said airstream exiting said cyclone separator substantially free of said particulate matter, said airstream discharged through a blower means, said particulate matter collected in said bag filter chamber being mechanically evacuated from said bag filter chamber to said debris box, said method for cleaning and removing said particulate matter collected in said debris box of said mobile vacuum loader comprising:

sealing said conduit from said debris box to said bag filter chamber so as to isolate said debris box from said bag filter chamber and prevent the passage of air and particulate matter therethrough;

positioning a bag separation means adjacent said mobile vacuum loader, said bag separation means having an inlet and an outlet, said bag separation means having a sealable bag secured therein;

positioning an outlet means on said debris box, said outlet means in communication with said inlet means on said bag separation means, said communication means comprising a conduit from said debris box to said bag separation means;

positioning an inlet means on said mobile vacuum loader, said inlet means secured to said bag filter chamber, said inlet means in communication with said outlet means on said bag separation means;

drawing negative pressure in said debris box by means of said blower on said mobile vacuum loader, thereby defining a path for air and particulate matter from said debris box through said outlet means on said debris box to said bag separation means, and from said bag separation means to said bag filter chamber by way of said inlet means to said bag filter chamber and thence to said cyclone filters and thence to said blower means, thereby removing and collecting said particulate matter from said debris box into said bag separation means for collection and disposal.

2. A method in accordance with claim 1 wherein said outlet means on said debris box and said inlet means on said bag filter chamber are in air-tight communication with said bag separation means.

3. An improved method in accordance with claim 1 wherein said outlet means on said debris box and said inlet means on said bag filter chamber are in a closed position when not in communication with said bag separation means.

* * * * *